Patented Dec. 27, 1938

2,141,938

UNITED STATES PATENT OFFICE 2,141,938

ARC WELDING FLUX

Thomas C. R. Shepherd, Stretford, England, assignor to General Electric Company, a corporation of New York No Drawing. Application December 14, 1936, Serial No. 115,883. In Great Britain January 8, 1936

2 Claims. (Cl. 219—8)

My invention relates to arc welding fluxes and more particularly to flux coated metallic arc welding electrodes.

In metallic arc welding the weld is produced through the agency of an arc established between the work and a metal rod or pencil commonly referred to as an electrode. By associating certain materials with the electrode, the operating characteristics of the welding arc and the quality of the weld metal deposited, are greatly improved. Such materials are referred to as fluxes.

It is an object of my invention to provide an improved arc welding flux.

It is a further object of my invention to provide a flux coated electrode which is particularly suited for hard surfacing operations.

Further objects of my invention will become apparent from a consideration of the following description.

As a coating for an electrode wire or rod, my improved flux has substantially the following composition by weight:

| | Percent |
|---|---|
| Manganese dioxide | 13 to 19 |
| Feldspar | 20 to 11 |
| Ilmenite | 27 to 39 |
| Ferro-manganese | 24 to 16 |
| Kaolin | Up to about 6 |
| Ferro-titanium | 10 to 8 | with enough sodium silicate, or other suitable binding medium, to provide a paste of suitable consistency.

The ferro-titanium content may be replaced in part by a larger quantity of ferro-chromium. These two materials may be introduced jointly to the extent of about 4% of the former and 15% of the latter.

This fluxing material is preferably applied directly to the electrode wire or rod without the intervention of a binding or wrapping of fibrous material. It may be applied to the rod by extrusion or by dipping.

My improved flux may be employed with electrode wires or rods having widely varying compositions, for example, with steels having a carbon content from as low as .1% or less to as high as about 1% to 1.3%, or with alloy steels containing, for example, chromium or molybdenum.

The hardest deposits are obtained when using wires or rods of the highest carbon content.

Except when depositing extremely hard surfaces, these electrodes may be used with either positive or negative polarity in direct current welding circuits. They are also quite suitable for use in alternating current circuits. Extremely hard deposits must be made with positive polarity using direct current.

Best results are obtained when depositing straight beads without employing any oscillatory movement.

The slag resulting from the flux coating is very fluid and it is sometimes possible, in the case of the softer electrodes, to lay down one bead on top of another without removing it from the weld metal, although it is preferable to remove it before adding another bead. The slag is in general quite easily removable, tending to flake off as the metal cools. Light taps with a hammer will readily remove all adhering scale.

The best welding position is that in which the electrode is tilted in the direction of travel, about 15° to 20° from the vertical through the welding point, when the work is in a horizontal position. Although the deposited metal is not of a particularly fluid nature, electrodes provided with my coating are best suited for use in performing welding operations on horizontally-disposed parts.

Electrodes embodying my invention are particularly suited for surfacing worn rails, points and crossings. They may also be used for the facing of dredger buckets, shovels and similar surfaces. When using the harder varieties of my electrodes, it is essential to remove by grinding all traces of surface cracks in the parent metal, otherwise these cracks will spread through the deposited weld metal and appear on the surface again. To prevent cracking, the parent metal may be heated to about 550° C. and maintained at this temperature during the welding operation. The deposits are of a work hardening nature.

Although I prefer to use my improved flux as a coating on electrodes, it may be used to facilitate arc welding operations in any other manner, such for example as by placing it upon the work at the point of welding.

What I claim as new and desire to secure by Letters Patent of the United States is:

1. A flux for use in arc welding having the following composition by weight:

| | Percent |
|---|---|
| Manganese dioxide | 13 to 19 |
| Feldspar | 20 to 11 |
| Ilmenite | 27 to 39 |
| Ferro-manganese | 24 to 16 |
| Kaolin | Up to about 6 |
| Ferro-titanium | *10 to 8 |

*Which may be replaced in part by a larger quantity of ferro-chromium.

2. An electrode having a coating of substantially the following composition by weight:

| | Percent |
|---|---|
| Manganese dioxide | 13 to 19 |
| Feldspar | 20 to 11 |
| Ilmenite | 27 to 39 |
| Ferro-manganese | 24 to 16 |
| Kaolin | Up to about 6 |
| Ferro-titanium | *10 to 8 | and a binder.

*Which may be replaced in part by a larger quantity of ferro-chromium.

THOMAS C. R. SHEPHERD.